United States Patent [19]

Maiorano

[11] Patent Number: 4,719,493
[45] Date of Patent: Jan. 12, 1988

[54] IMAGING SYSTEM INCLUDING A SEGMENTED FILAMENT LIGHT SOURCE WITH IMPROVED ILLUMINATION OUTPUT UNIFORMITY

[75] Inventor: Dominick J. Maiorano, Webster, N.Y.

[73] Assignee: Xerox Corporation, Stamford, Conn.

[21] Appl. No.: 22,151

[22] Filed: Mar. 5, 1987

[51] Int. Cl.[4] .............................................. G03B 27/54
[52] U.S. Cl. ...................................... 355/67; 350/628; 355/1; 362/16
[58] Field of Search ................. 355/1, 71, 67; 362/16, 362/217, 291, 342, 343, 347; 350/612–614, 628

[56] References Cited

U.S. PATENT DOCUMENTS

| 3,763,348 | 10/1973 | Costello | 219/347 |
| 4,194,385 | 3/1980 | Shiode | 355/67 |
| 4,239,369 | 12/1980 | English et al. | 362/16 X |
| 4,300,831 | 11/1981 | Isago | 355/67 |
| 4,517,630 | 5/1985 | Dieffenbach et al. | 362/347 X |
| 4,682,885 | 7/1987 | Torigoe | 355/67 |

FOREIGN PATENT DOCUMENTS 55-65941 5/1980 Japan .
56-78853 6/1981 Japan .
58-58576 4/1983 Japan .

OTHER PUBLICATIONS

"Copier Illumination System", Maddox et al; IBM-TDB, vol. 20, #2, Jul. 1977, pp. 488–489.

Primary Examiner—Richard A. Wintercorn

[57] ABSTRACT

The output of a segmented filament lamp is smoothed and made more uniform by placing a reflector assembly adjacent the lamp, the reflector assembly comprising a plurality of joined specular hybrid cylindrical/roof mirror segments. Each segment is located so as to reflect light from a portion of each filament back into the filament plane to form an image of each filament in interfilament space. The lamp output thus appears as a uniform and constant source. This type of improved filament lamp is especially useful in conjunction with an imaging system which requires a very uniform light level at a projection lens or at the surface of a document platen.

5 Claims, 9 Drawing Figures

IMAGING SYSTEM INCLUDING A SEGMENTED FILAMENT LIGHT SOURCE WITH IMPROVED ILLUMINATION OUTPUT UNIFORMITY

The present invention relates to a light source and, more particularly, to a linear segmented filament lamp assembly which provides an improved uniformity in illumination output.

Recently, interest has arisen in reproduction machines or copiers that, in addition to, or in lieu of, performing the usual copying function, also are capable of reading a document image and converting the image to electrical signals or pixels, which then may be stored in memory, transmitted to a remote site via a suitable data communication channel and used to control a light generating system for writing images on a photosensitive image member. One type of image writing system requires a high intensity beam of light which normally requires the use of a relatively expensive laser. This system further requires a relatively sophisticated optical system comprising, in addition to the usual lenses and mirrors, a device such as a rotating polygon to scan the light beam across the image member and a modulator such as an acousto-optical type modulator to modulate the beam in accordance with the content of the image signal or pixel input. Coupled with this is the need for complex and expensive electronic circuitry for operating the writing mechanism in timed synchronization with the reproduction machine or copier with which it is associated.

An alternate, less expensive and less complex image writing system is known in the art, which requires the use of an addressable linear optical image bar in conjunction with a linear short focal length lens array. The illumination output of the image bar is selectively controlled by input signals representing the document to be reproduced. The lens array projects the image bar output onto the photosensitive image member to form a latent image of the document, the latent image being subsequently developed and transferred to an appropriate record medium. Optical image bars fall generally into two categories; those which are self-luminous such as light-emitting diode (LED) arrays and those which are transmissive and require a light source input such as liquid crystal shutters (LCSs). According to one aspect of the present invention, there is provided an improved light source to be used with the latter type image bar.

A conventional light source presently used in conjunction with the non-luminous optical image bar is a fluorescent lamp. This type of lamp is characterized by having relatively low radiance and is only suitable for imaging systems which have imaging members and lens arrays characterized by radiometrically fast responses. As an example, gradient index lens arrays manufactured by Nippon Sheet Glass Co., Inc. under their trade name of SELFOC are available as a relatively fast lens (SLA20 SELFOC) and radiometrically slower lenses (SLA9 and SLA12 SELFOC). These lens arrays are suitable for use as an imaging device in reproduction machines but a fluorescent lamp is practical only with the SLA20 lens array. The slower SLA9 and SLA12 lenses require an illumination source with a higher radiance output. Various segmented filament lamps such as segmented halogen quartz lamps have found wide usage as the illumination device of choice for these lenses in photocopying machines. However, if the slower response lens arrays are used in conjunction with the non-self-luminous image bars, these segmented filament lamps have been found to produce gross radiance variations in the lens array direction. This problem is illustrated in FIG. 1.

Figure 1:
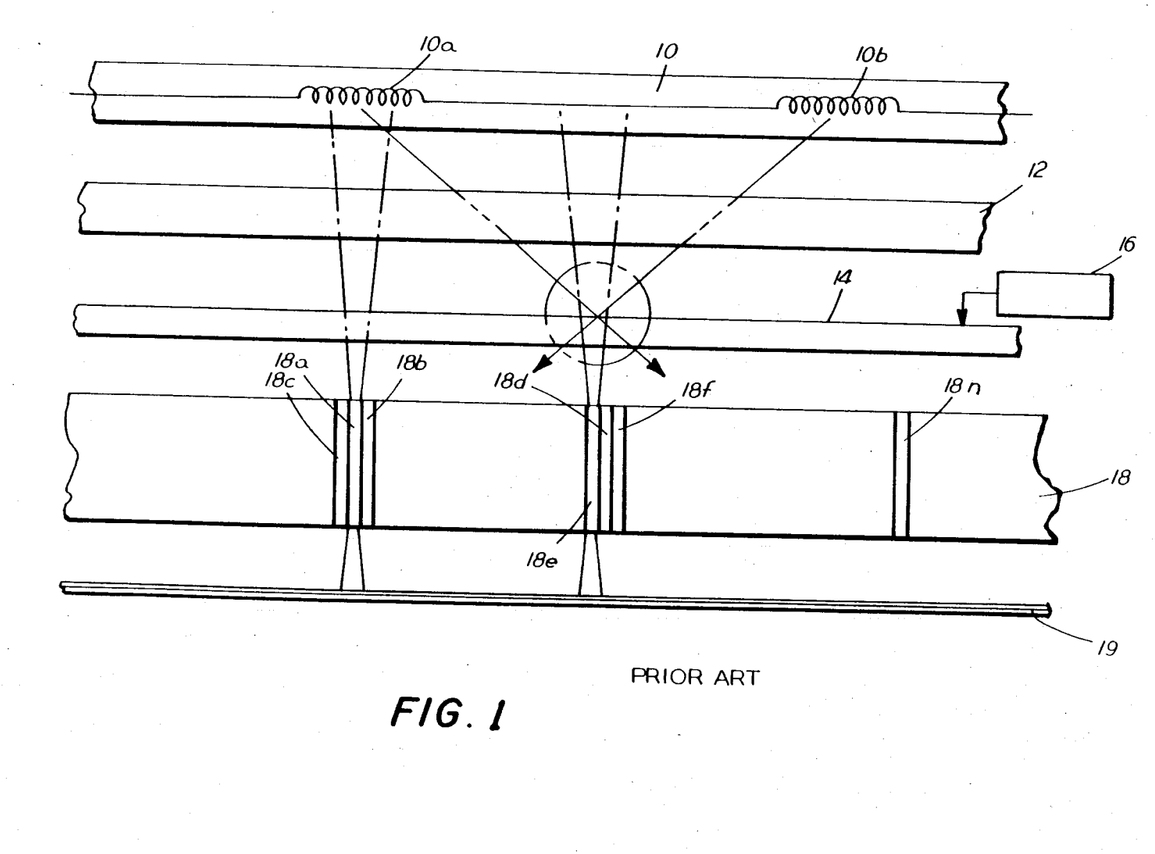
FIG. 1 shows a partial front view of an optical imaging system, utilizing a segmented filament lamp having a non-uniform radiation output.

FIG. 1 shows a partial front sectional view of an imaging system consisting of a segmented tungsten lamp 10, a cylindrical condensing lens 12 (which has optical power in the array direction shown), liquid crystal shutter (LCS) image bar 14, signal source 16, an SLA9 SELFOC lens array 18 comprising a plurality of gradient index optical fibers 18a, 18n and a photosensitive image member 19. It is assumed that input signals from source 16, representing document information, have altered the transmissive state of image bar 14, rendering the bar selectively transmissive. The light output from the illustrated portion of lamp 10 is shown as being emitted from filaments 10a, 10b. Each optical fiber of lens array 18 has a total field view of 18°. Fiber 18a directly beneath a filament 10a (assuming an overlying transmission portion of bar 14) will transmit a high illumination level to the member 19 surface. However, the circled area of LCS bar 14 also receives radiation from filaments 10a and 10b but this radiation arrives at high angles of incidence. Much of this radiation is outside the field of view of fibers 18d, 18e, 18f and therefore is not transmitted by these fibers. As a result, the light transmitted by fibers 18d, 18e, 18f onto the surface of member 19 is at a lower level than that transmitted by fibers 18a, 18b, 18c. This non-uniform illumination results in a document latent image having non-uniform charge patterns which, in turn result in undesirable non-uniformity in the output copy quality.

Figure 2:
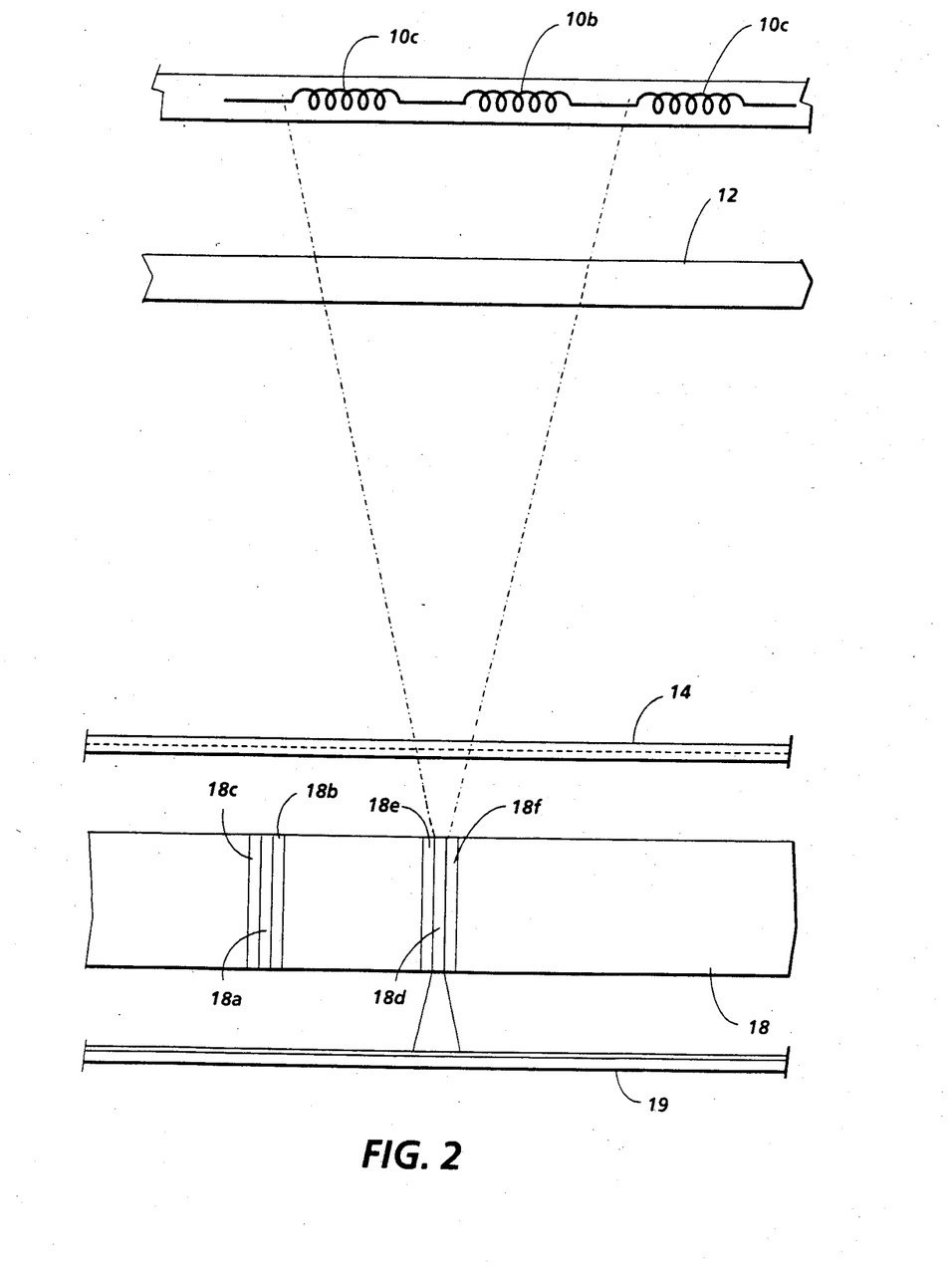
FIG. 2 shows the view of FIG. 1 with the radiation output uniformity improved by moving the lamp away from the image plane.

One approach for making a more uniform output is to move lamp 10 away from lens array 18 as is shown in FIG. 2. The lens fibers 18,a,b,c, etc., are now within the field of view of one full filament and halves of two other filaments; e.g. fiber 18d is illuminated fully by filament 10b and by ½ of filament 10a and 10c. For most imaging systems known, this arrangement would require an excessive amount of space since, generally, a more compact arrangement is required.

It would therefore, be desirable to achieve the improved uniformity shown in FIG. 2 without the necessity of moving the lamp a considerable distance from the lens and image plane. Various methods for improving lamp uniformity are known in the art and are described in the following representative publications.

1. U.S. Pat. No. 4,194,835 to Shiode discloses an exposure device for an electrophotographic copying machine. As shown in FIG. 5 of the patent, the device includes a cylindrical lamp 30 with segmented filaments 33 and an elliptical reflecting mirror 35. The segmented filaments provide a reduction emission which is condensed into a belt-like flow of beams and applied to the exposure position.

2. U.S. Pat. No. 4,300,831 to lsago discloses an exposure and illumination device containing a semi-cylindrical reflector 1, a linear light source 3 and a hollow cylinder 2.

3. Japanese Kokai (Laid-Open) Publication No. 58-58576 discloses a light source device for a flash fixing (fusing) system. Referring to the illustrations, reflector 3 has an inverted W shape which allows flash lamp 2 to illuminate a document with high intensity, thus improving the fusing efficiency of the system.

4. IBM Technical Disclosure Bulletin, Vol. 20, No. 2, July 1977, pp. 488–9, by Maddox et al discloses a copier illumination device with a reflecting elliptical cylinder 12 and tungsten halogen lamp 10. Reflectors are used to concentrate a large amount of luminous flux onto footprint 11.

5. Copending Application Ser. No. 885,128 filed July 14, 1986 and assigned to the same assignee as the present invention, discloses a segmented filament lamp whose output is optimized by placing a spherical segmented reflector in proximity to the lamp.

6. Japanese Pat. No. 55-65941 to Sagane discloses a lighting device for a slit exposure type copying machine. A plurality of linearly placed, small light sources are provided with quadradic-surface-of-revolution reflecting plates for each source. The focus of each plate is located at its respective light source.

7. Japanese Pat. No. 56-78853 to Miyake et al discloses a device employable for uniformly irradiating a slit illumination range. Linearly spaced, discrete light sources are provided with a small reflective material for each source. The reflective material is placed in the path connecting each light source and the original slit illumination region. Further, the light sources are partially surrounded by a reflective shade. Thus, the light from each discrete source is redirected to act as light beams which illuminate from a different position.

8. U.S. Pat. No. 3,763,348 to Costello teaches a technique for providing a uniform illumination to a surface. A line source of irradiation is positioned along the major axis of, and at a predetermined distance from, a curved reflective member. The image plane supporting the surface to be irradiated is provided at a predetermined distance from the image focal point. Further, the image plane is aligned perpendicular to the major axis of the reflecting member. The direct radiation and the reflected radiation from the source combine to provide a uniform illumination across the image surface.

The present invention is distinguished over the prior art by using a plurality of roof mirrors joined together to form a linear array, the array then positioned with respect to the filament lamp to enhance output. More particularly, the invention is directed to an imaging system comprising, in combination, a linear, short focal length lens array, a segmented, filament lamp, a reflector positioned adjacent said lamp, said reflector comprising a series of specular hybrid cylinder/roof mirror segments, each segment positioned with respect to the filament segments of said lamp so as to form real images of a portion of each filament in the spaces adjacent the real filaments.

Figure 3:
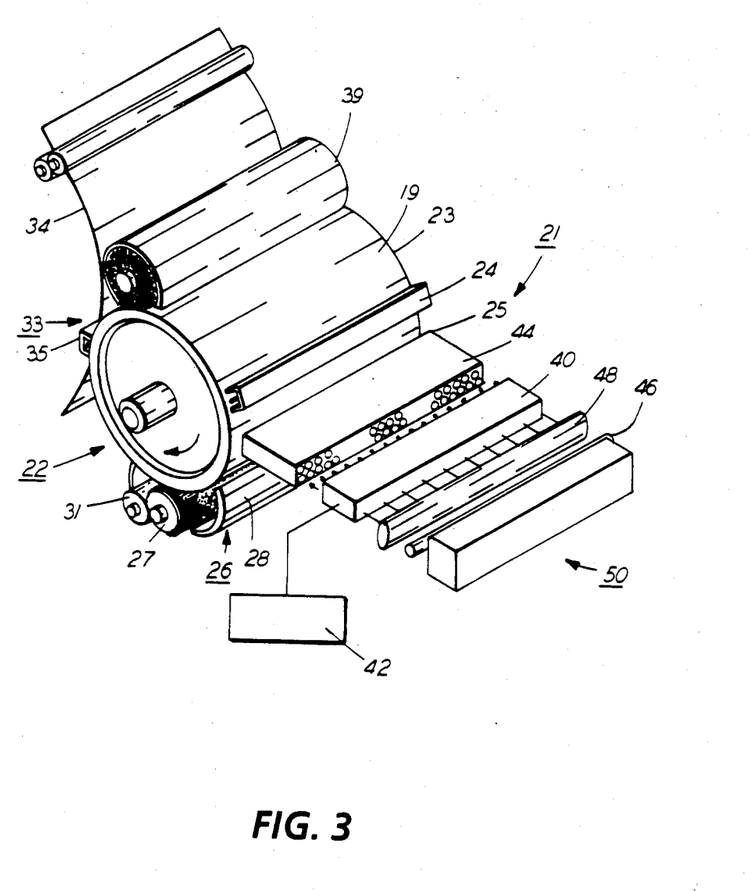
FIG. 3 shows a plane view of a document reproduction machine incorporating an optical imaging assembly utilizing a series of specular hybrid cylinder/roof mirror segments formed into a linear reflector assembly and used in conjunction with a segmented illumination source in a print mode of operation.

Referring to FIG. 3, the optical imaging system of the present invention, designated generally by the numeral 21, is shown in combination with a reproduction machine 22. As will appear, reproduction machine 22 is operable in a WRITE mode to expose photosensitive image member 19 thereof in accordance with an image signal input to create copies or reproductions. Reproduction machine 22 is a xerographic-based system using, as the photosensitive image member, a photoreceptor 23 in the form of a drum supported for rotation in a suitable housing or enclosure (not shown). A suitable motor (not shown) rotates drum 23 in the direction shown by the solid line arrow during operation of reproduction machine 22. A suitable corona charging device or corotron 24 is disposed in operative relationship with photoreceptor 23, corotron 24 serving to place a uniform electrostatic charge on photoreceptor drum 23 preparatory to exposure thereof.

Photoreceptor 23 is exposed at an exposure station 25 downstream of corotron 24 in a manner to be more fully described hereinbelow, such exposure creating a latent electrostatic image on the surface of photoreceptor 23. Following exposure, the latent electrostatic image on photoreceptor 23 is developed by a suitable developer 26 illustrated herein as a magnetic brush developing roll 27. Magnetic brush developing roll 27 is rotatably disposed at a suitable developer housing 28, the lower portion of which forms a sump or reservoir for a supply of developer material. A suitable developer loading device illustrated herein is a donor roll 31 which serves to draw developer from the sump and load the same onto developing roll 27, the magnetic forces generated by suitable magnets internal of developing roll 27 (not shown) serving to attract and hold at least a portion of the developer material on the exterior surface of developing roll 27. On disposition of developer material into operative relationship with photoreceptor 19, toner is attracted to the latent electrostatic image on the photoreceptor from developing roll 27 in proportion to the electrostatic forces to render the latent electrostatic image on photoreceptor 19 visible.

Following development of the latent electrostatic image, the developed image is carried by photoreceptor 23 to transfer station 33 where the developed image is transferred from photoreceptor 23 surface to a suitable copy substrate material shown here as a sheet 34 of copy paper brought forward by a suitable copy sheet feeder in timed relation to arrival of the developed image on transfer station 33. To facilitate transfer, a transfer corotron 35 is disposed opposite the photoreceptor at transfer station 33. The copy sheet 34 bearing the developed image is carried to a suitable fusing or fixing device (not shown) where the toner image is permanently adhered to the copy sheet 34. A cleaning station downstream of transfer station 33 serves to remove any leftover developing material on the photoreceptor prior to making the next image. In the exemplary copier shown, a cleaning brush 39 is provided for this purpose.

Figures 4, 5:
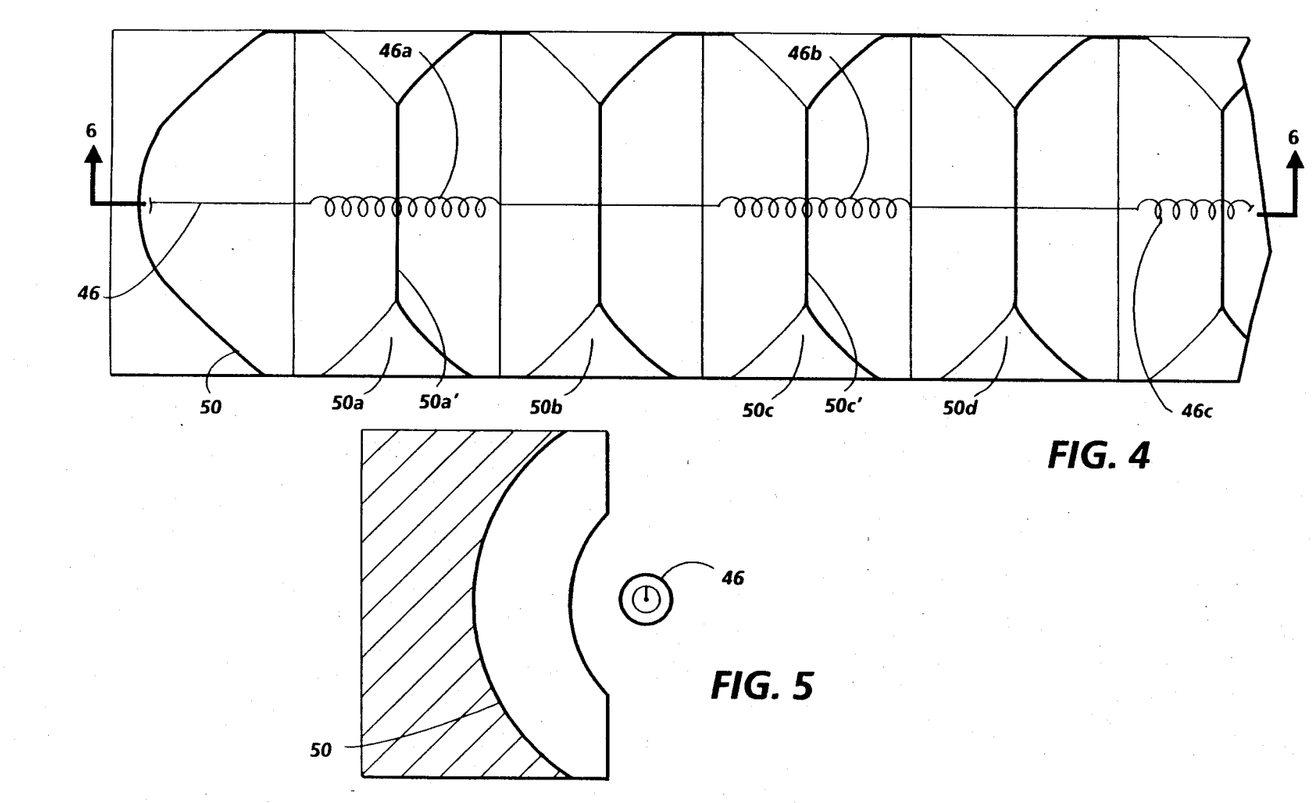
FIG. 4 shows a partial front view, enlarged, of the lamp and reflector assembly of FIG. 3.
FIG. 5 shows an end view of the lamp and reflector assembly of FIG. 3.
Figure 6:
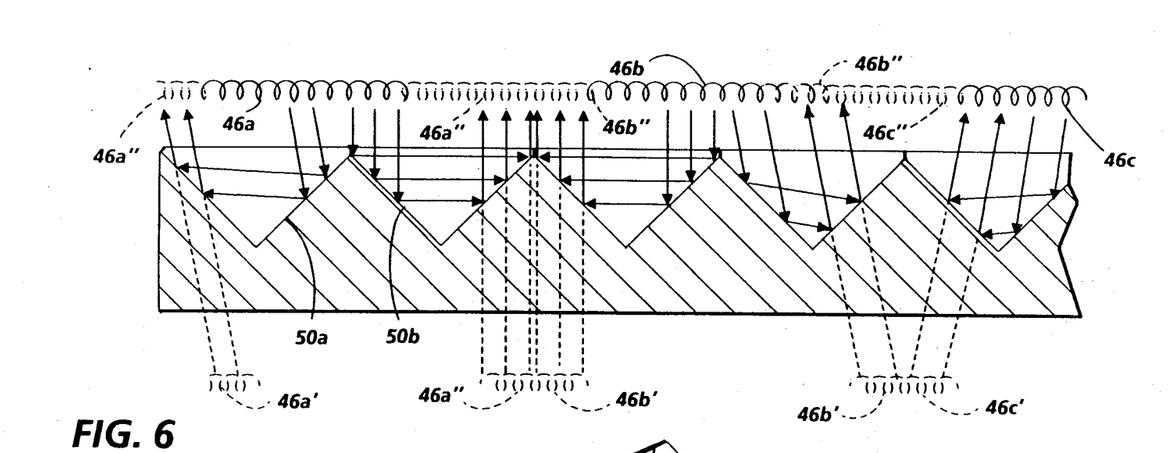
FIG. 6 is a view of the lamp and reflector assembly of FIG. 4 taken through view A—A.
Figure 7:
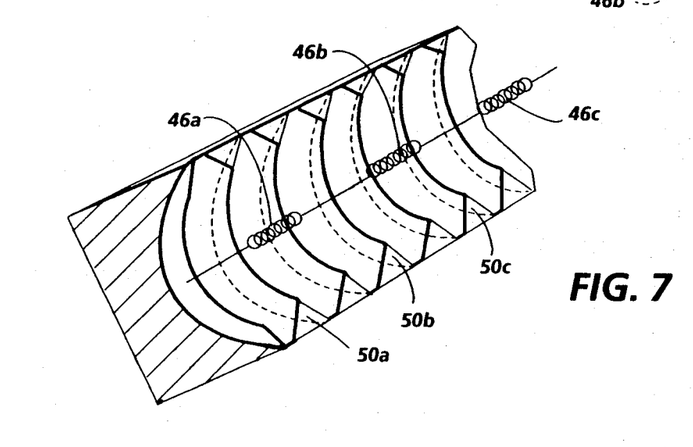
FIG. 7 is a perspective view of the lamp and reflector assembly of FIG. 5 along angle B.

Turning now to the optical imaging system 21, the system comprises a linear, generally rectangular optical image bar 40 which, in the preferred embodiment, is a liquid crystal shutter. Preferably, the width of bar 40 in a cross scan direction is substantially equal to the effective width of photoreceptor 23. The light transmissive state of bar 40 is controlled by input signals representing document information from signal source 42. A linear gradient index lens array 44 is disposed in predetermined spaced relationship between the surface of photoreceptor 23 and the output face of image bar 40. In a preferred embodiment, lens array 44 is an SLA9, SELFOC lens, the term SELFOC being a Registered Trademark owned by Nippon Sheet Glass Co., Ltd. The light input to the entire face of image bar 40 is provided by a segmented filament lamp 46. The light output from lamp 46 is preferentially directed into image bar 40 by cylindrical condensing lens 48. The light output from lamp 46 is rendered uniform by placing a specular reflector assembly 50 in a position adjacent to lamp 46 such that real images of the filaments are produced at unit magnifications in the spaces between the filaments. This property of reflector 50 is shown more clearly with reference to FIGS. 4–7. FIG. 4 is a front view of assembly 50 showing that the assembly is comprised of a series of specular hybrid cylindrical/roof mirror segments 50a, 50b, etc. Lamp 46 consists of a plurality of filament segments 46a, 46b, etc. FIG. 5 is an end view of assembly 50 showing that the reflector has the powers of a cylindrical reflector. FIG. 6 is a view through Section A—A of FIG. 4 and FIG. 7 is an angled view in the B direction of FIG. 4. As shown in in FIG. 4, the center of each filament segment is opposite an apex (into the page) of a mirror segment, e.g. corner mirror 50a apex 50a' is opposite a filament segment 46a, as shown in FIG. 6. Light is reflected from each segment so as to form virtual images 46a', 46a'b', 46b'c', etc. and real images of 46a", 46a"b", etc. The virtual images are formed by the roof mirror properties of the mirror segment while the real images are formed by the cylindrical properties of each mirror segment. The real images are formed so as to completely fill the spaces between filament segments 46a, 46b, etc. These images are, in turn, viewed at angles which fill the aperture of lens array 44 (FIG. 3), providing an improved uniformity output at the surface of drum 19. With reference to FIG. 6, it can be seen that rotating the assembly 50 about the axis of lamp 46 would, in effect, be the same as bending segments 50a, 50b, radially about the lamp axis. The result would be to concentrate light at position 46a",46b",46c".

Figure 8:
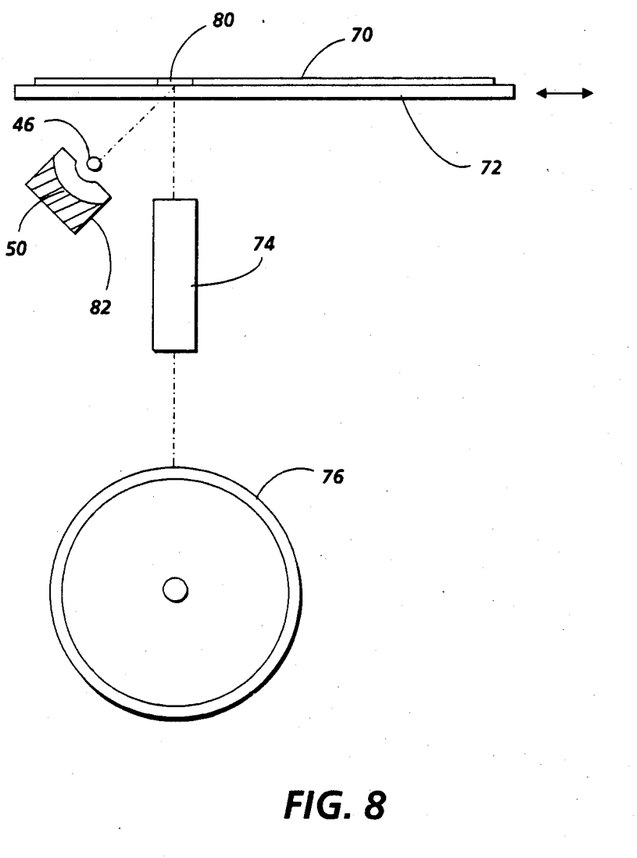
FIG. 8 shows the side view of a document reproduction machine incorporating the illumination lamp assembly of the present invention in a copy mode of operation.

While the imaging assembly has been described above as useful in a print mode, the illumination lamp assembly of the present invention may also be used as the illumination source in a copy mode of operation. FIG. 8 illustrates a copying machine wherein a document 70 to be copied is placed on transport platen 72. A SELFOC TM lens array 74 is placed between the platen and a photoreceptor drum 76. A segmented tungsten lamp 78 is positioned beneath the platen with its light output preferentially directed so as to illuminate an incremental scan strip on the platen. Platen 72 is adopted to move horizontally in a scanning cycle carrying the entire document past the illuminated scan strip 80. Incremental images are reflected downward into the entrance face of array 74 and projected onto the surface of drum 76, forming a latent image of the document thereon. In order to ensure a uniform illumination level at the scan strip, lamp 78 has an associated reflector 82 which can be, for example, the array discussed in connection with the FIG. 2, 3 and 4 embodiments.

While the invention has been described with reference to the structure disclosed, it is not confined to the details set forth, but is intended to cover such modifications or changes as may come within the scope of the following claims. For example, other types of linear lens arrays such as strip lenses may be used instead of the SELFOC TM.

Figure 9:
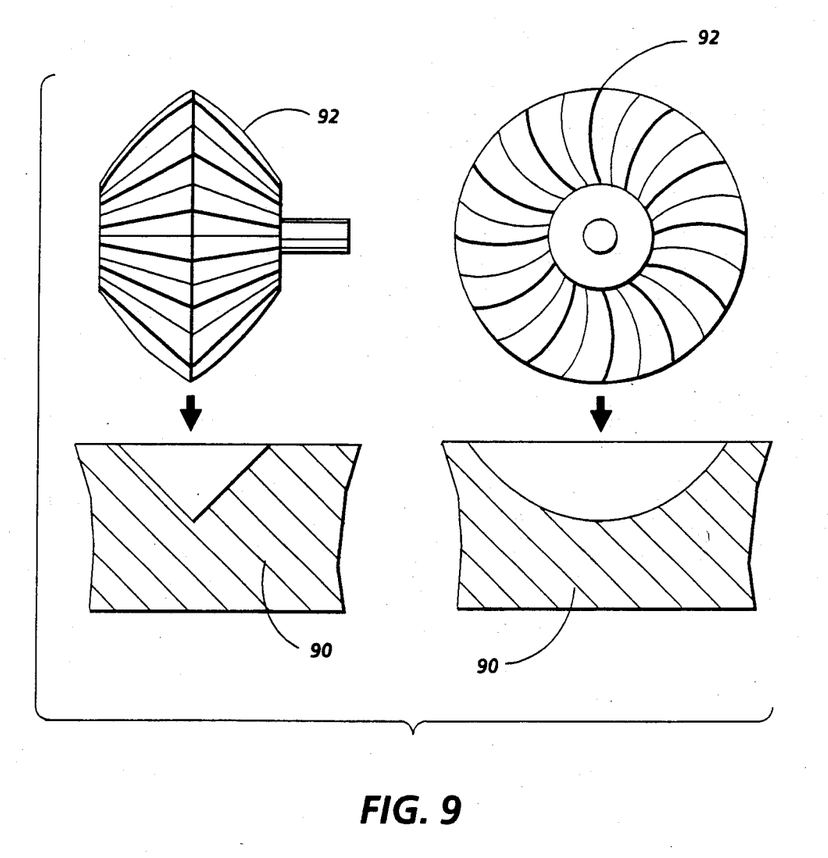
FIG. 9 shows one method of making the hybrid/cylinder roof mirror reflector assembly.

One method of making a mirror assembly is shown in the assembly steps of FIG. 9. An aluminum material work piece 90 is stepped in a direction parallel to cutting tool 92. The tool moves into the work piece in the direction indicated, first shaping the aluminum piece to provide the roof mirror properties, then lifting, rotating, and again moving into the work piece to impart the cylindrical properties. Subsequent cuts are accomplished along the work direction, forming a series of hybrid cylindrical/roof mirror areas.

What is claimed is:

1. An imaging system comprising, in combination a linear, short focal length lens array, a segmented filament lamp, a reflector assembly positioned adjacent said lamp, said reflector comprising a series of specular hybrid cylindrical/roof mirror segments, each segment positioned with respect to the filament segments of said lamp so as to form an image of a portion of each filament in the spaces adjacent the lamp filaments, and an addressable image bar placed between said lamp and said array.

2. The imaging system of claim 1 wherein the center of each of the filaments is positioned at an apex of one of the mirror segments.

3. The imaging system of claim 1 wherein a virtual image of the lamp segments is formed by the roof mirror characteristics of each mirror segment and a real image is formed in the spaces between the lamp filaments and along the lamp axis by the cylindrical properties of said mirror segment.

4. In a document printing machine wherein a latent image is formed on a photosensitive surface by a light pattern projected by a document imaging system, the improvement wherein the imaging system comprises, in combination, a linear, short focal length lens array, a segmented, filament lamp, a reflector assembly positioned adjacent said lamp, said reflector comprising a series of specular hybrid cylindrical/roof mirror segments, each segment positioned with respect to the filament segments of said lamp so as to form an image of a portion of each lamp filament in the spaces adjacent the lamp filaments, and an addressable image bar placed between said lamp and said array.

5. A document illumination system for illuminating a document lying in an object plane, the system comprising a linear segmented filament lamp positioned beneath said object plane and a linear reflector assembly positioned adjacent said lamp, said reflector comprising a series of hybrid cylindrical/roof mirror segments, each segment positioned, with respect to the lamp filament segments so as to form an image of a portion of each filament into the spaces between the real filament segments.

* * * * *